Patented July 7, 1936

2,047,069

UNITED STATES PATENT OFFICE 2,047,069

AMIDES

Winfrid Hentrich, Erlangen, Helmut Keppler, Cologne-on-the-Rhine, and Karl Hintzmann, Wiesdorf-on-the-Rhine, Germany, assignors, by mesne assignments, to General Aniline Works, Inc., New York, N. Y.

No Drawing. Application April 13, 1931, Serial No. 529,890. In Germany May 9, 1930

10 Claims. (Cl. 252—1)

The present invention relates to compounds suitable for use as auxiliary agents for the textile and related industries in particular to wetting, washing, frothing, emulsifying, dispersing, purifying, softening and leveling agents and assistants in mercerizing consisting of condensation products from aliphatic, aromatic or cycloaromatic amino- mono- or bicarboxylic acids, or the salts thereof, containing a primary or secondary amino group and saturated or unsaturated fatty acids, or their derivatives, of high molecular weight. By fatty acids of high molecular weight we mean such acids as contain at least 8 carbon atoms in the molecule.

These condensation products are obtainable in the usual manner by causing a saturated or unsaturated higher fatty acid of the kind referred to above, or a derivative thereof, to react with an aliphatic or aromatic or cycloaromatic aminomono- or dicarboxylic acid containing a primary or secondary amino group or a salt thereof.

The process itself can also be carried out with the halides, anhydrides or esters of the above mentioned fatty acids in different ways. As far as these compounds are also new as substances they correspond to the probable general formula:

$$R-CO\cdot\underset{\underset{R_1}{|}}{N}-R_2\cdot COOX$$

wherein R stands for an alkyl radical containing at least 7 carbon atoms which may be unsaturated, $R_1$ means hydrogen or an aliphatic, cycloaliphatic or aromatic hydrocarbon radical which may be substituted, for instance, by COOH, COONa, Cl, $NO_2$, OH and so on, $R_2$ represents an alkylene, aralkylene or arylene radical, which may be substituted, X stands for hydrogen, ammonium ($NH_4$) or a metallic equivalent. Such products are, for instance, stearyl-diglycolamide acid of the formula:

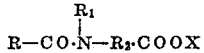

which, in the form of its sodium salt constitutes a soap-like colorless substance having a valuable effect as wetting, purifying and softening agent, oleyl-amido-benzoic acid of the formula:

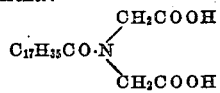

which is a substance of the same quality as the diglycolamide acid mentioned above. The substance is especially distinguished by its wetting, softening and leveling power.

If during the condensation process a mixture of different saturated or unsaturated fatty acids of a high molecular weight are employed, valuable mixtures of condensation products are obtained. The products of the reaction which are chemically amino-carboxylic acids, the nitrogen atom of which is connected to higher fatty acid radicals, represent in the form of their alkali metal salts colorless or weakly colored soap-like substances soluble in water with a great frothing capacity. Contrary to the usual soaps of higher fatty acids the new compounds show a better solubility in water and a greater stability to acid reagents. They are particularly distinguished by the fact that their alkali metal salts also show a good wetting effect in strong alkaline solution due to which property they are very suitable as auxiliary products in the mercerizing process.

The following examples will illustrate our invention but without limiting it thereto. The parts are by weight.

*Example 1.*—13.3 parts of aspartic acid are dissolved by means of 80 parts of a 10% aqueous caustic soda lye and 130 parts of water. After the addition of 25 parts of acetone, 30 parts of oleic acid chloride and 40 parts of a 10% aqueous caustic soda lye are introduced with good stirring in such a manner that the reaction liquid remains constantly alkaline. Suitably the temperature shall not be allowed to rise above 50° C. After the oleic acid chloride has been consumed the temperature is slowly raised to 60° C. Any oily product formed in a small quantity can be removed by filtration. The filtrate, after having been neutralized and evaporated, yields a colorless soft, soap-like mass which easily dissolves in water. The solution froths strongly.

100 parts of the product obtained in this manner are dissolved in 10000 parts of an aqueous caustic soda lye of 32° Bé. strength or in other lyes of a higher or lower concentration as are technically used for the purposes of mercerizing, if necessary, with the addition of 20–30 parts of oil of turpentine (technical). The resulting lyes possess an especially good wetting capacity to cotton which can be mercerized in an unboiled state with these lyes. Besides the improvement of luster a more even mercerizing effect could be observed. Instead of the product from oleic acid and aspartic acid used herein corresponding condensation products from oleic acid with N-methyl-aspartic acid or with aspartic acids containing other radicals connected to the nitrogen atom may be used.

Also with other aliphatic amino-carboxylic acids, such as diglycolamide acid, products possessing similar properties can be obtained by reacting the said amino-carboxylic acids with higher fatty acids. In the form of their sodium salts they are colorless masses easily soluble in water.

Example 2.—A sizing bath containing 60 parts of potato flour and 1 part of oleyl-sarcosine sodium salt (oleyl-methyl-amido acetic acid sodium salt), that is the condensation product of oleic acid and methyl-amino-acetic acid, in 1000 parts of water is prepared and cotton warps are sized therewith. By the addition of the oleyl-sarcosine salt the pasty starch penetrates the fabric better whereby a much better stiffness of the fabric is obtained.

Example 3.—4 parts of methyl-cyclo-hexanol are introduced, while stirring, into a solution of 10 parts of the sodium salt of oleyl-sarcosine in 100 parts of water. A washing preparation is thus obtained which efficiently removes fats and oils from textile goods and which may be used together with the usual washing agents, such as soap, alkalies etc.

Example 4.—100 parts of oleyl-sarcosine are dissolved in 10000 parts of an aqueous caustic soda lye of 23 to 36° Bé. strength as used for the mercerizing purposes in the textile industry. Oleyl-sarcosine dissolves easily and clearly in these lyes and improves the wetting capacity of the same whereby the cotton is mercerized more quickly and more evenly.

Example 5.—Mixtures of oleyl-sarcosine and suitable solvents, such as ethylene glycol, oil of turpentine, acetone, methyl-cyclo-hexanone or ethylene-glycol-mono-cresyl-ether and other solvents can be used besides the oleyl-sarcosine mentioned in Example 4.

Example 6.—Cotton is dyed with:

| | Percent |
|---|---|
| Cotton red 4B (see Colour Index, First Edition, Jan. 1929, page 93, number 370) | 3 |
| Sodium carbonate | 2 |
| Glauber's salt | 30 |
| Sodium salt of oleyl-sarcosine | 1 | in a boiling bath. The wetting of the cotton is facilitated, and uniform dyeings are obtained by the addition of oleyl-sarcosine. In a similar manner oleyl-glycine, oleyl-α and β-alanines etc. can also be employed.

Example 7.—3 parts of the sodium salt of oleyl-butyl-amino-acetic acid are introduced into 3000 parts of a washing bath for wool and 120 parts of wool in the suint are washed therein. Contrary to the usual soap this soap is more productive, froths especially strongly, and the washing process is accelerated.

Example 8.—100 parts of the sodium salt of a condensation product from sarcosine and a mixture of lower fatty acids as can be obtained by the oxidation of paraffin are dissolved in a little water and then added to 10,000 parts of an aqueous caustic soda lye as used for mercerizing purposes in the textile industry.

The product dissolves easily and clearly in these lyes and improves the wetting capacity thereof whereby cotton can be mercerized more quickly and more evenly.

Example 9.—137 parts of 3-amino-benzoic acid are dissolved in 250 parts of pyridine; 300 parts of oleic acid chloride are added thereto while stirring well and the reaction mass is finally heated to a temperature of about 80 to 100° C. The reaction product is precipitated by adding water and then converted into the sodium salt. The product represents a weakly colored mass easily soluble in water and corresponds to the formula:

Cotton is introduced into a wetting bath containing per liter of water 2 grams of the sodium salt of the oleyl-amino-benzoic acid. A quick and even wetting is achieved and in a following dyeing process an even dyeing can be observed.

In an analogous manner the condensation product is prepared from amino-benzoic acid and stearylchloride.

When artificial silk or cotton is treated in a bath containing 2 grams of the sodium salt of the stearyl-m-amido-benzoic acid per liter a soft touch is granted to the goods.

Example 10.—153 parts of 5-amino-2-hydroxy-benzoic acid are dissolved by means of 400 parts of a 10% aqueous caustic soda lye, 600 parts of water and 200 parts of acetone. 300 parts of oleic acid chloride and 400 parts of a 10% aqueous caustic soda lye are gradually added while strongly stirring, the temperature being maintained below 50° C. After the oleic acid chloride has been consumed, the reaction product can be precipitated by the addition of an acid.

20 grams of viscose silk is dyed in a bath of one liter containing:

0.6 gram of Cotton red 4B (see Colour Index, First Edition, Jan. 1929, page 93, number 370)
0.2 gram of sodium carbonate
4 grams of Glauber's salt and
0.2 gram of oleyl-amido-salicylic acid sodium salt at a temperature of about 80° C. By the addition of the oleyl-amido-salicylic salt the material acquires a soft touch. A similar effect is obtained by replacing the oleyl-amido-salicylic salt by palmitoyl-sarcosine.

Wherever occurring in the claims, the term "amino carboxylic acid" is to be construed as covering not only amino carboxylic acids but also their water-soluble salts.

We claim:

1. In the process of treating textile material with aqueous liquids the modification which comprises subjecting the material to the action of an amino carboxylic acid containing at the most two carboxylic acid groups and being acylated in an amino group with the radical of a fatty acid having at least 8 carbon atoms.

2. In the process of treating textile material with aqueous liquids the modification which comprises subjecting the material to the action of an aliphatic aminocarboxylic acid containing at the most two carboxylic acid groups and being acylated in an amino group with the radical of a fatty acid having at least 8 carbon atoms.

3. In the process of treating textile material with aqueous liquids the modification which comprises subjecting the material to the action of an aliphatic amino monocarboxylic acid acylated in an amino group with the radical of a fatty acid having at least 8 carbon atoms.

4. In the process of treating textile material with aqueous liquids the modification which comprises subjecting the material to the action of a water soluble salt of an amino acetic acid acylated in the amino group with the radical of a fatty acid having at least 8 carbon atoms.

5. In the process of treating textile material with aqueous liquids the modification which comprises subjecting the material to the action of a water soluble salt of a monoalkyl amino acetic acid acylated in the amino group with the radical of a fatty acid having at least 8 carbon atoms.

6. In the process of treating textile material with aqueous liquids the modification which comprises subjecting the material to the action of a salt of oleyl methyl amino acetic acid (oleyl sarcosine) with a member of the class consisting of the alkali metals and ammonium.

7. In the process of treating textile material with aqueous liquids the modification which comprises subjecting the material to the action of an aliphatic amino dicarboxylic acid acylated in an amino group with the radical of a fatty acid having at least 8 carbon atoms.

8. In the process of treating textile material with aqueous liquids the modification which comprises subjecting the material to the action of a water soluble salt of oleyl aspartic acid.

9. In the process of treating textile material with aqueous liquids the modification which comprises subjecting the material to the action of an aromatic aminocarboxylic acid containing at the most two carboxylic acid groups and being acylated in an amino group with the radical of a fatty acid having at least 8 carbon atoms.

10. In the process of treating textile material with aqueous liquids the modification which comprises subjecting the material to the action of a water soluble salt of stearyl m-aminobenzoic acid.

WINFRID HENTRICH.
HELMUT KEPPLER.
KARL HINTZMANN.